July 15, 1952    C. J. RAFFERTY    2,603,138
TRACTOR IMPLEMENT

Filed Oct. 5, 1948    3 Sheets-Sheet 1

Inventor.
CLARENCE J. RAFFERTY

Paul O. Pippel
Att'y

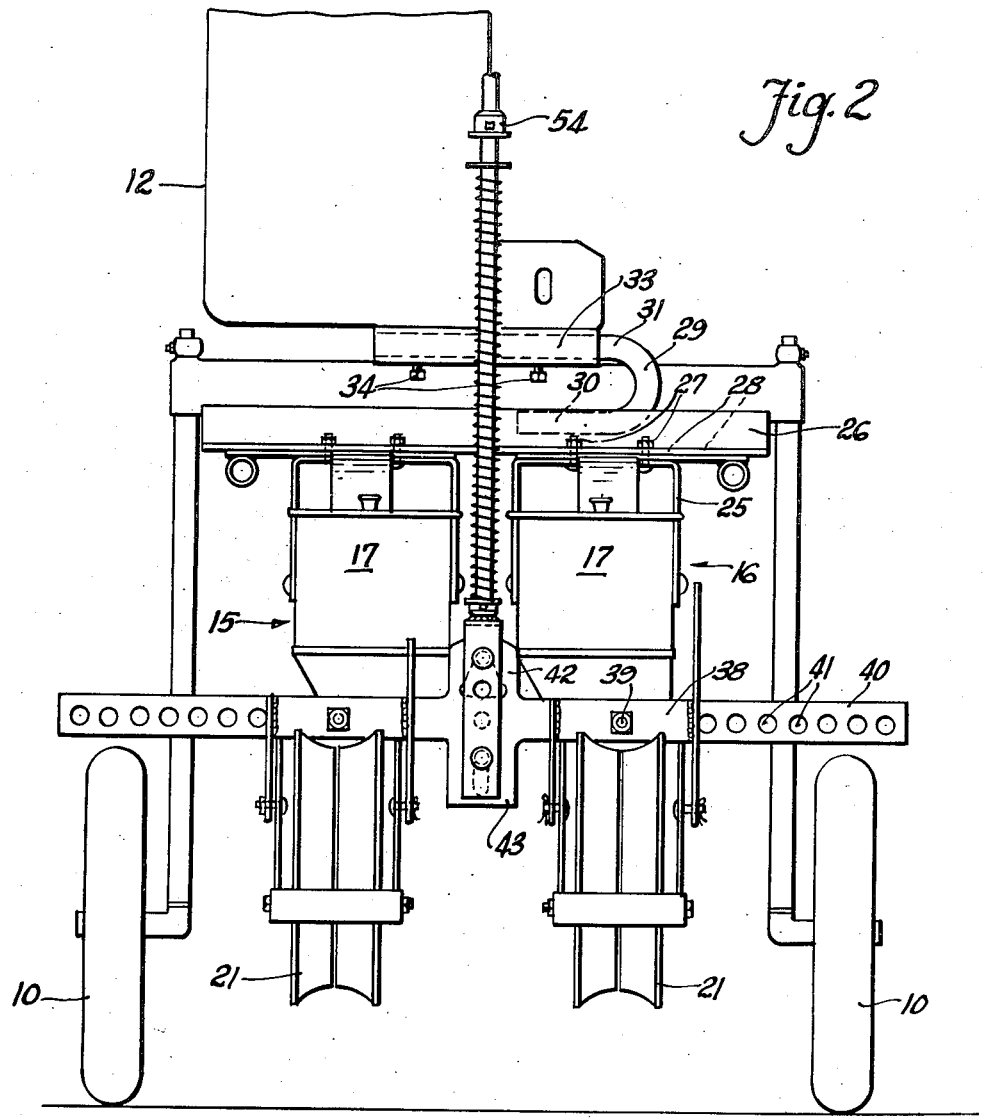

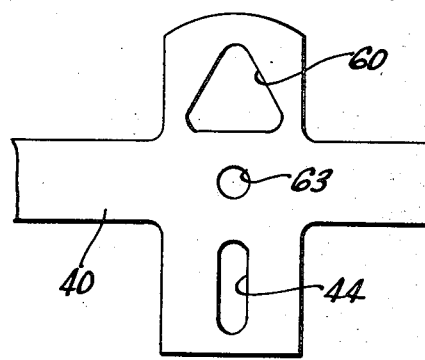
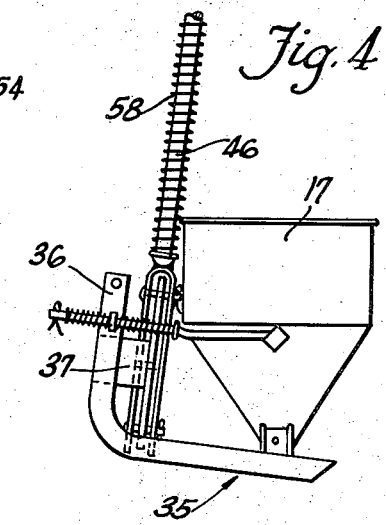
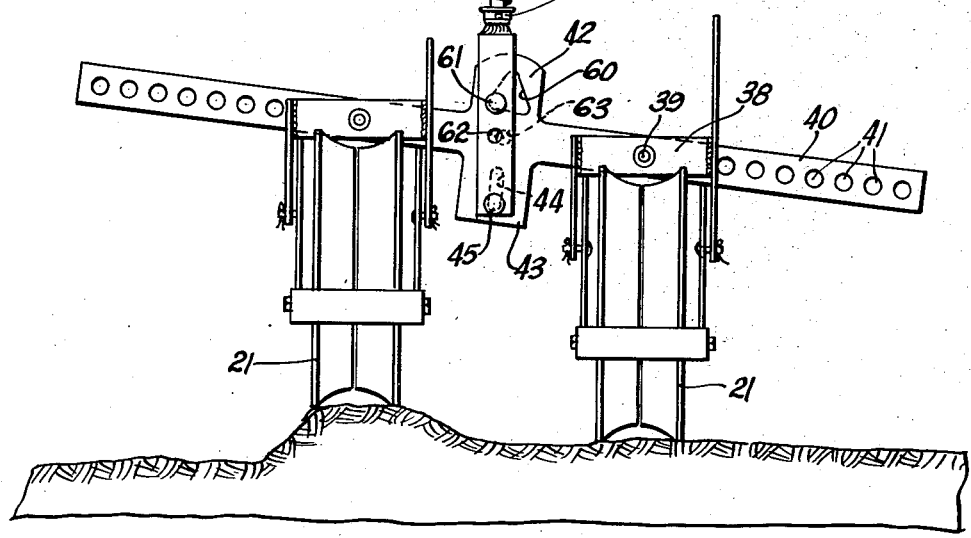

Patented July 15, 1952

2,603,138

UNITED STATES PATENT OFFICE 2,603,138

TRACTOR IMPLEMENT

Clarence J. Rafferty, Memphis, Tenn., assignor to International Harvester Company, a corporation of New Jersey Application October 5, 1948, Serial No. 52,815

5 Claims. (Cl. 97—47)

This invention relates to agricultural implements and particularly to a tractor mounted planter. The invention is especially adapted for use upon small tractors where space for mounting, as well as raising and lowering the implements, is at a premium. The planter of the present invention is mounted upon a four-wheeled tractor of the offset type wherein the longitudinally extending body of the tractor is laterally removed from the longitudinal center line of the tractor.

The tractor is provided with lifting mechanism consisting generally of means for rocking a rock shaft mounted midway of the tractor and having an arm secured to the end thereof for connection to the implement. The implement which is shown in the drawings is a two-row planter mounted generally symmetrically with the longitudinal center line of the tractor, and a lifting connection is made thereto by linkage connecting the lift arm on the tractor to a point midway between the planter units.

It is desirable that the furrow opening units of planters be mounted so that when in operating position they can rise and fall independently with changes in the contour of the ground. Upon raising the planter to transport, however, it is required that the planter units be substantially parallel to the ground line so as to clear obstructions. In a two-row planter of the type shown weight conditions as between the two units vary due to variations in the manufacture thereof. Likewise in filling planter hoppers it is substantially impractical to so distribute the seed or other material as between the hoppers of the several units as to secure uniform weight therebetween. Therefore while a pivotal connection is made between the lifting means and the planter unit to accommodate independent movement thereof, it has been the tendency for weight differences to appear when the planter is lifted. The result is that one unit, being heavier than the other, will not balance.

An object of the present invention is to provide an improved tractor mounted implement.

Another object of the invention is to provide means in a tractor-mounted planter or the like to compensate for weight differences as between different units of the implement.

A further object of the invention is to provide in a tractor mounted planter comprising a pair of laterally spaced units connected to the lifting mechanism of the tractor, means for connecting the lifting mechanism to the implement to accommodate independent vertical floating movement of the units of the implement in operating position while providing means for maintaining the units parallel to the ground and in aligned relationship when raised to transport position.

Another object of the invention is to provide novel means connecting the units of a planter together to permit variations in the spacing therebetween. The same connecting means between the planters includes means whereby the units may move vertically independently about a longituinal axis therebetween in operating position, and means for assuring that the units will be transversely aligned and parallel to the ground when raised to transport.

Other objects and advantages of the invention will become clear from the following detailed description when read in conjunction with the accompanying drawings wherein:

Fig. 2 is a rear elevation of the planting mechanism shown in Fig. 1 with the implement in raised position and showing the relationship thereof with respect to the body of the tractor.

Fig. 3 is a partial view in rear elevation of certain important elements of the present invention.

Fig. 4 is an enlarged detail of a portion of the planter structure shown in Fig. 1.

Fig. 5 is an enlarged detail showing a portion of a part by which the two planter units are connected together.

Figure 1:
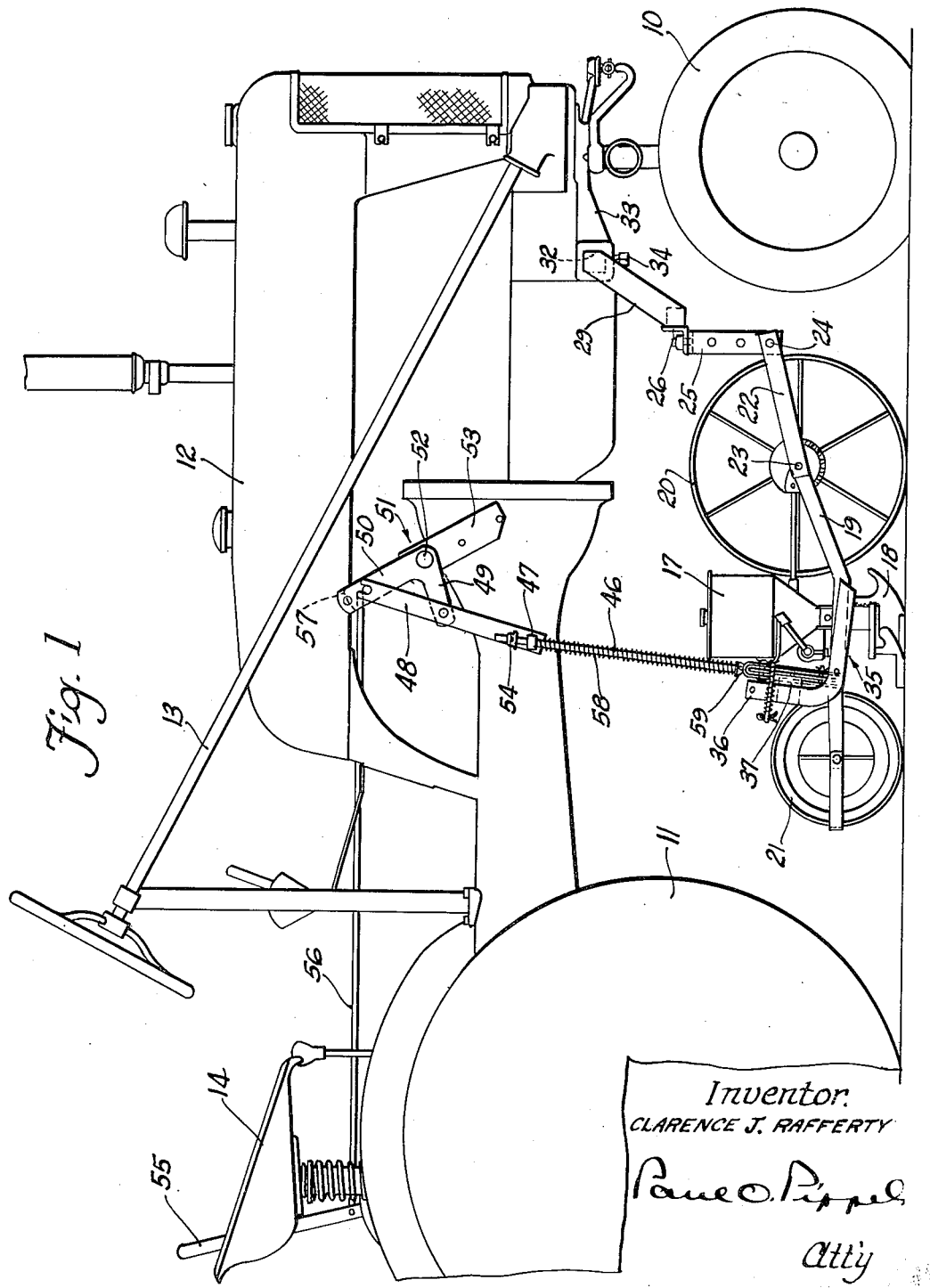
Fig. 1 is a view in side elevation of a tractor of the offset type having mounted thereupon a planter embodying the features of the present invention.

Referring to the drawings, it will be noted that the planter of the present invention is mounted upon a tractor having laterally spaced front wheels 10, rear drive wheels 11, only one of which is shown, a laterally offset body 12, steering mechanism 13, and an operator's seat 14.

The planter of the present invention comprises two laterally spaced units 15 and 16. These units are substantial duplicates and a brief description of one will suffice for both. The units are conventional planter structures and each comprises generally a hopper 17 from which seed is dispensed to furrows formed by furrow openers 18. A furrow opener and dispensing mechanism are mounted upon a frame structure 19 carrying a front drive wheel 20 for the seed dispensing mechanism and a rear press wheel 21 which serves to cover with soil the seed deposited in furrows formed by the opener 18. For details of construction not contained herein, reference may be made to the patent to Raney et al, No. 2,269,987.

Each of the units 15 and 16 is connected to the tractor for independent relative vertical floating by mechanism, including a pair of laterally spaced arms 22 pivoted at their rear ends upon the axle 23 of the wheel 20, and pivotally mounted at their forward ends upon a transversely extending pivot pin 24, carried by a yoke 25 secured to an angle bar 26. Each yoke 25 is secured to the angle bar 26 by bolts 27 receivable in any of a plurality of openings 28 provided in the angle bar.

Likewise secured to the angle bar 26, as, for example, by welding, is a U-shaped member 29 square in cross-section, having one arm 30 affixed to the angle bar and the other arm 31 extending upwardly therefrom.

Laterally extending arm 31 of the U-shaped member 29 is received for sliding movement transversely in an opening 32 provided in a casting 33 secured to and forming a part of the body of the tractor. Set screws 34 are provided for securing the arm 31 against movement with respect to the supporting casting 33.

It should now be clear that each of the units 15 and 16 of the planter is capable of rising and falling independently with respect to the tractor and to each other about the pivotal connections 23 and 24. The units are connected together so that they may be lifted simultaneously by mechanism including a pair of brackets 35, one at each side of the unit carried by the frame 19, and each having an upstanding arm 36 to which has been affixed a yoke 37 having a transverse portion 38. The transverse portion 38 of the yoke is pivotally connected by means of a bolt 39 to a transversely extending connecting member 40. The member 40 is provided with a plurality of openings 41 for the reception of the bolt 39 whereby the units may be laterally adjusted with respect to the connecting member to vary the distance between the units as desired for row-spacing purposes.

Member 40 is provided at its central portion with an enlarged section comprising an upwardly extending lug 42 and a downwardly extending lug 43. As may be observed particularly well in Fig. 3, lug portion 43 of the connecting member 40 is provided with a vertically extending slot 44 adapted to receive and confine a pivot pin 45 carried at the bifurcated lower end of a lift link 46, the upper end of which is slidably received in a swivel 47 carried upon a strap 48 secured to the arms 49 and 50 of a bell crank 51. Bell crank 51 is mounted upon a rock shaft 52 extending transversely of the tractor and supported thereupon by one or more uprights 53 secured to the body of the tractor. A retaining collar 54 is provided at the upper end of the lift link 46. It should now be clear that upon rocking the shaft 52 and bell crank 50 in a clockwise direction, as viewed in Fig. 1, the collar 54 will engage swivel 47, and pin 45 will engage the upper end of the slot 44 to lift the planter from the ground. Rocking of the shaft 52 to lift the planter is accomplished by a conventional lever and quadrant device 55 mounted upon the tractor adjacent the driver's seat and connected by a rod 56 to an arm 57 at the other end of shaft 52.

It will be observed that by virtue of the pivotal connection of the pin 45 with the slot 44 that the units 15 and 16 are capable of independent vertical movement with respect to each other, as indicated graphically in Fig. 3. The entire implement is allowed to move vertically upwardly by virtue of the sliding relationship of the lift link 46 with the swivel 47. The implement is resiliently urged downwardly by a spring 58 surrounding the rod or link 46 and abutting at its upper end the swivel 47 and at its lower end a collar 59.

Relative movement between the connecting member 40 and the lift link 46 is provided by movement of pin 45 in slot 44. As pointed out before, the pivoting of the member 40 about pin 45 permits the independent floating movement of the planter units with respect to each other; however, as likewise pointed out before, it is necessary that when the implement be raised to transport position the planter units be in transverse alignment and parallel to the ground. In order to accomplish this purpose and maintain the capacity of the planter units for independent movement, applicant has provided, in addition to the vertically extending slot 44, a triangularly shaped slot or opening 60 in the upstanding lug portion 42 of the connecting member 40. This opening 60 is adapted to receive a pin 61 vertically spaced from pin 45 and carried by the lower portion of the link or lift rod 46.

It will be observed from a study of Fig. 3, the planter is in operating position travelling on uneven ground and the left hand unit as shown is passing over a rise in the ground so that the pin 61 has moved to the left-hand corner of the triangularly shaped slot 60. In normal operation the pins 45 and 61 engage the lower extremity of their respective slots. However, upon raising the implement to transport position, lift link 46 moves upwardly and pin 45 rises in the slot 44 until it engages the upper end thereof. Should one of the units, for example, the right-hand unit as viewed in Fig. 3, be somewhat heavier than the other unit, as is invariably the case, the implement would tend upon lifting to retain the position shown, that is with the connecting member 40 on an angle and one unit being carried lower than the other; however, by virtue of the relationship of pin 61 with slot 60, upon lifting the implement off the ground pin 61 will engage the side of the triangle formed by the slot 60. The side of the triangle will function as a camming surface as the pin rises in the slot and the connecting member 40 will be forced into a straight line position parallel with the ground line. Pin 61 will thus be seated at the apex of the triangle 60 at the same time that pin 45 is received at the upper end of slot 44. These two points are in vertical alignment and confine the pins 45 and 61 against lateral displacement so that the units are held in transverse alignment as indicated in Fig. 2. The planter units thus are automatically aligned upon lifting and may be transported without mishap. This automatic alignment while raising the planter is very valuable, particularly when turning at the end of a row. For more permanent maintenance of the units in aligned position rigid with the connecting member 40, a circular opening 62 is provided in the lower portion of the link 46 between the pins 45 and 61 and is adapted to register with an opening 63 formed in the member 40 between the slots 44 and 60, and a pin may if desired be inserted therein.

From the foregoing description it should be clear that a novel planting mechanism has been described wherein a pair of laterally spaced units may be lifted by a single link pivotally connected to a member extending therebetween in order that the units may rise and fall independently with changes in the contour of the ground and wherein means are provided for maintaining the planter units in alignment and parallel to the ground when the implement is lifted to transport position.

While the invention has been described in its preferred embodiment, it should be understood that modifications may be made therein without departure from the spirit of the invention or the scope of the appended claims.

What is claimed is:

1. In an implement adapted to be mounted upon a vehicle having lift means thereon for raising and lowering the implement, a pair of laterally spaced furrow opener units, means connecting each unit to the vehicle for independent vertical floating movement relative thereto and to each other, a rigid connecting member extending between said units and to which each of the units is pivotally secured, a lift link extending between the vehicle lift means and said connecting member at a location between said units, vertically spaced openings formed in said member, and vertically spaced pin means carried by said link and registrable with said openings to connect the link to said member, at least one of said openings being sufficiently broad in a transverse plane to accommodate independent vertical floating movement of the units.

2. In an implement adapted to be mounted upon a vehicle having lift means thereon for raising and lowering the implement, a pair of laterally spaced furrow opener units, means connectitng each unit to the vehicle for independent vertical floating movement relative thereto and to each other, a rigid connecting member extending between said units and to which each of the units is pivotally secured, a lift link extending between the vehicle lift means and said connecting member at a location between said units, vertically spaced openings formed in said member, vertically spaced pin means carried by said link and registrable with said openings to connect the link to said member, at least one of said openings being sufficiently broad in a transverse plane to accommodate independent vertical floating movement of the units, and said one opening having a restricted portion adapted to receive the respective of said pin means when the planter is raised to transport position whereby said member and said units are maintained parallel to the ground.

3. An agricultural implement adapted to be mounted upon a tractor having lift means thereon for raising and lowering the implement comprising a pair of laterally spaced earth working units, means connecting each unit to the tractor for independent vertical floating movement relative thereto and to each other, a rigid connecting member extending between said units and to which each of the units is pivotally secured, vertically spaced openings formed in said member centrally thereof between the units, a lift link connecting the tractor lift means and said member, said link having vertically spaced pin means registrable respectively with the openings in the member, each of said openings being in the form of a vertically extending slot adapted to cooperate with the pin means to maintain said member and said units parallel to the ground in raised position, and one of said openings having a widened portion effective in the operating position of the units to accommodate independent vertical floating movement of each unit relative to the other.

4. An agricultural implement adapted to be mounted upon a tractor having lift means thereon for raising and lowering the implement comprising a pair of laterally spaced earth working units, means connecting each unit to the tractor for independent vertical floating movement relative thereto and to each other, a rigid connecting member extending between said units having a plurality of apertures formed therein and spaced longitudinally thereof, pivot means receivable in any of said apertures for pivotally connecting each unit thereto, a lift link carried by the tractor lift means and having a pivotal connection with said member to accommodate tilting of said connecting member about a longitudinal axis between the units and independent vertical floating movement of the units in their operating position, and means in the connection of the lift link to the member for holding said member and said units parallel to the ground when raised to transport position, the pivotal connection of each unit to the member being adapted to compensate for the tilting of the member to maintain each unit on a level with the ground.

5. An agricultural implement adapted to be mounted upon a tractor having lift means thereon for raising and lowering the implement comprising a pair of laterally spaced earth working units, means connecting each unit to the tractor for independent vertical floating movement relative thereto and to each other, a rigid connecting member extending between said units having a plurality of apertures formed therein and spaced longitudinally thereof, pivot means receivable in any of said apertures for pivotally connecting each unit thereto, a lift link carried by the tractor lift means and having a pivotal connection with said member to accommodate tilting of said connecting member about a longitudinal axis between the units and independent vertical floating movement of the units in their operating position, and means in the connection of the lift link to the member and operable automatically to hold said member and said units parallel to the ground when raised to transport position, the pivotal connection of each unit to the member being adapted to compensate for the tilting of the member to maintain each unit on a level with the ground.

CLARENCE J. RAFFERTY.

REFERENCES CITED

The following references are of record in the file of this patent:

UNITED STATES PATENTS

| Number | Name | Date |
| --- | --- | --- |
| 391,298 | Cease | Oct. 16, 1888 |
| 1,085,374 | Bollenbach | Jan. 27, 1914 |
| 1,204,298 | Mire | Nov. 7, 1916 |
| 1,550,956 | Geffroy | Aug. 25, 1925 |
| 1,696,562 | Allen | Dec. 25, 1928 |
| 2,269,987 | Raney et al. | Jan. 13, 1942 |
| 2,363,749 | Rude | Nov. 28, 1944 |